(12) United States Patent
Shultz et al.

(10) Patent No.: US 12,118,326 B1
(45) Date of Patent: Oct. 15, 2024

(54) ARTIFICIAL INTELLIGENCE-BASED POLITICAL MESSAGING SYSTEM, APPLICATION AND METHOD

(71) Applicant: AI Political Messaging LLC, Reno, NV (US)

(72) Inventors: Larry Shultz, Beverly Hills, CA (US); Dragos Dima, Craiova (RO)

(73) Assignee: AI Political Messaging LLC, Reno, NV (US)

(*) Notice: Subject to any disclaimer, the term of this patent is extended or adjusted under 35 U.S.C. 154(b) by 0 days.

(21) Appl. No.: 18/429,609

(22) Filed: Feb. 1, 2024

(51) Int. Cl.
- *G06F 40/40* (2020.01)
- *G06F 40/30* (2020.01)
- *G06Q 50/00* (2024.01)
- *H04L 51/02* (2022.01)

(52) U.S. Cl.
CPC ............ *G06F 40/40* (2020.01); *G06F 40/30* (2020.01); *G06Q 50/01* (2013.01); *H04L 51/02* (2013.01)

(58) Field of Classification Search
CPC ......... H04L 51/02; G06F 40/40; G06F 40/30; G06Q 50/01
See application file for complete search history.

(56) References Cited

U.S. PATENT DOCUMENTS

| | | | |
|---|---|---|---|
| 6,311,211 B1* | 10/2001 | Shaw | G06Q 10/107 709/206 |
| 2013/0238989 A1* | 9/2013 | Chu | G06F 16/9538 715/273 |
| 2014/0224872 A1* | 8/2014 | Griggs | G07C 13/00 235/380 |
| 2015/0106170 A1* | 4/2015 | Bonica | G06F 16/24578 705/12 |
| 2021/0248688 A1* | 8/2021 | Schutt | G06Q 50/26 |
| 2022/0229832 A1* | 7/2022 | Li | G06F 16/243 |

* cited by examiner

*Primary Examiner* — Soe Hlaing
(74) *Attorney, Agent, or Firm* — Rivka Friedman

(57) ABSTRACT

Described herein is a computer-implemented system for generating political messages for social media, comprising a user interface receiving inputs like a Political Candidate's name and a selection indicating support or opposition, a large language Model utilizing in-context learning and a Knowledge Base with data categories such as news, government, census/voter polling, candidate websites, and legislative voting records to process the inputs and refining messages based on user-chosen issues, candidate names, message topics/themes, and tones, and an AI Message Generator creating political messages for social media.

24 Claims, 5 Drawing Sheets

ARTIFICIAL INTELLIGENCE-BASED POLITICAL MESSAGING SYSTEM, APPLICATION AND METHOD

FIELD OF THE INVENTION

The present invention relates to methods for leveraging social media platforms to increase voter engagement and turnout and, in particular, relates to utilizing the aggregating power of social media platforms to facilitate the creation and distribution of text-based, text-to-audio and narrated video-based social-cause/political Issue-promoting and Candidate-promoting Get-Out-the-Vote (GOTV) and Donation-Request Messages.

BACKGROUND

Historically, political campaigns have utilized a variety of methods to reach voters, including traditional advertising, canvassing, and phone banking. While these methods remain effective to some extent, there is a growing need for innovative approaches that can harness the widespread influence of social media to "get out the vote" (GOTV). Social media platforms with text-based and video-based formats have become integral to modern communication, with billions of users globally who are eligible voters. However, existing methods often fail to fully leverage the potential of these platforms to encourage voter participation.

Current challenges include limited ways for voters to easily and effectively write, create, or share political messages with their social networks because many voters do not feel confident enough in their abilities to sufficiently research and compose/write a factually correct and persuasive message. One of the biggest reasons for low voter turnout by eligible-age younger voters is the extremely strong, personal fear of being embarrassed in public because they feel they are less educated and uninformed about the important issues of the day or about the Candidates running for office, even though these voters care about their home/city/state/country and want their elected officials to fix problems that affect them locally and nationally. In fact, the majority of voters, young and old, do not even know what Legislative District they live in, nor do they know the name of their local Congressperson, or who is running for office in their local voting district-basic information that every citizen and "informed voter" should know.

At the same time, the United States, and other nations, are grappling with low voter turnout exacerbated by legislative measures enacted by politicians to purposely make voting more restrictive, inconvenient, and difficult for eligible voters to participate in the democratic election process. These voter suppression laws are designed to enable a minority of voters to disproportionately influence the election of representatives who may not fully reflect the preferences of the majority of citizens, resulting in a governance system where decisions are made by a minority. This diminution of proportional representation has created a pressing social need for a more effective and innovative approach to inspire, persuade, and motivate the majority of citizens to participate as informed voters, and even as voter-activists, in the electoral process.

Political Candidates spend a lot of money on various marketing and promotion campaigns to reach out to the voter to "Get-Out-the-Vote" by using all means to increase voter turnout, including multimedia advertisements, press interviews, and holding voter/donor meet-and-greet events, which all add to the cost of election campaigning.

These political campaign marketing problems are amplified for national and state political groups and parties that have multiple Candidates to promote. For instance, if the Democrat or Republican Party, or a celebrity with millions of social media followers wanted to individually promote each of the 435 Republican or 435 Democrat Candidates running for the 435 open seats in the U.S. Congressional election every two years, they would have to create and send 435 individual social-media messages promoting the name and campaign website URL link of each District Candidate separately. This requires 435 individual messages to be created for each Candidate and sent by the political party's or a celebrity's social media account, which is not practical, would look like "spam" and increasing the cost of message-creation and distribution for national political parties and political action committees to promote their Candidates locally.

Efforts have been made in the past to provide a solution to some of the stated problems above. US20,070,272749A1 discloses a system where a poll worker uses an Internet-enabled portable device to record when a registered voter votes and transmits that information to a central database in real-time. Campaign headquarters view and manipulate real-time voting data submitted by poll workers to create targeted phone and walk lists and various other reports for use during an election day to increase the number of votes and after the election for statistical analysis. Despite providing the solution to increase voter turnout the system disclosed here does not provide a reliable, automated, and cost-effective solution.

Another document US20,070,288302A1 only provides access to and maintenance of various enrolled Internet services and purchased Internet tools for elections and campaign supporter donations. This does not provide any proper solution to increase the voter turnout. These technologies though useful are still in their nascent stage in terms of providing a solution to the present-day problem of low voter count.

There is therefore a pressing need for a technology-driven solution to address the challenges associated with low voter turnouts that empowers voters to mobilize their social networks effectively to increase voter participation. The aim is to bridge this gap by utilizing the extensive reach of social media to empower voters to virally disseminate Candidate-promoting Get-Out-the-Vote messages and political Issue-promoting Donation-Request Messages, thereby fostering a more inclusive and representative democratic system.

Objective of the Invention

The present invention aims to address the aforementioned issues of low voter interest and low voter turnouts due to limitations encountered by politicians to effectively reach out to citizens directly to exercise their rights to vote and have a say over the laws being passed by Legislators, by enabling local, state, and national Social Media Influencers with millions of followers (who are Voters) to pro-actively use their social media platforms every day to send out Issue-Oriented Political Messages that are shared, reach, and inspire to vote, the tens and hundreds of millions of Voters on social media who are patriotic, love their country and would be happy and proud to help solve local and national issues and problems by sharing persuasive text-based and short documentary-style videos using the text-based message as the Text-to-Audio/Video narrative track.

The present invention also aims to address the "fear of writing" and the "fear of voting" issues, and increase the response of the message-recipient/voter side by providing a novel, all-electronic, AI-assisted method that encourages voters to use social media for the creation and widespread dissemination of political messages that inform voters of the issues and promote increased civic engagement.

An objective of the present invention is to bring new confidence to reluctant voters, uninformed voters and voters who lack composition writing experience or confidence by using AI-assisted technological capabilities to simplify the user-creation of compelling, succinct and fact-filled text-based and audio/video-based, Issue-oriented, Get-Out-the-Vote Messages with statistical graphs, charts and tables that can enable young voters/Message-Recipients to become sufficiently educated and informed about the Political Issues of the Day to confidently express their opinions and responsibly choose the best Local Candidate to Vote—for, who promises to get the underlying problems fixed.

An objective of the present invention is to create a novel system/method/apparatus that enables the use of AI/machine learning to use the visual contents of the Knowledge Base that contains statistical graphs, charts, and tables as the Visual Images to be used in a combination of Text-to-Audio matched with Text-to-Image processes that match the visual meaning/interpretation of the Text-based words/phrase and meaning of the narrated text.

An objective of the present invention is to provide a system and method that automates, facilitates, simplifies, streamlines, and enables political parties, Political Action Committees (PACs), registered candidates and their election campaign marketing staffs, consultants, donors, Celebrity supporters and activist-voters on social media to compose, store, edit and distribute their own AI-assisted text-based, text-to-audio and audio/video-based Political Issue-oriented Messages with statistically persuasive and emotionally inspiring content that introduces and promotes their preferred Candidate for the message-recipient to vote—for.

An objective of the present invention is to automate the process of compiling and displaying relevant visual images from online resources; graphs, charts, and tables from the Knowledge Base resources used in the creation of the text-based message; and available video-segments from online resources, finalized with user-input/written Title Graphics, End Credits/Contact/Donation Links, and pan/zoom/wipe image-transitions to create visually-appealing and intellectually-interesting Issue-oriented short-form Documentary-style Video of images that are relevant to the words/phrases/meaning and issue/theme/tone of the text-based message, and timed exactly to accompany the text-to-voice audio narration.

Another objective of the present invention is to create AI Political Messages and social cause-promoting messages in multiple message formats to reach the maximum number of users who are eligible voters, first as a Text-based Message that can be shared by email, by SMS/text-messaging and on X/Threads and Facebook social media messaging platforms; as a Narrated Text-to-Audio file format for Podcasts and Radio promotional segments; and as a Documentary-style Narrated Video file format for the most popular online/mobile platforms, TikTok, Instagram, Snapchat and YouTube, serving audiences with hundreds of millions of viewers daily, who may not be frequent users of X/Threads or other text-based social media.

Another objective of the present invention is to automate the process of determining the voting districts of social media message-recipients who are voters, by recognizing and creating the specific profile of the preferred candidate running for election in the voting district of the message-recipient, whose opinions and stance on the issues as a voter may be similar to the local Candidate's, and showcasing all-in-one online/mobile platform high-value Voter Empowerment Tools and online links that enable any eligible voter to Register to Vote through the platform, identify the voter's voting district, preferred local Candidates running for office, local Candidate website links, Voter Alarm reminder to vote and GPS Directions to Voter's assigned local Polling Place and Mail—In Ballot Drop Box locations during available voting hours.

Another objective of the present invention is to enable national and state political parties and political action committees that have hundreds of candidates to promote each candidate locally by sending only one message nationally on various social media platforms that is received by hundreds of millions of potential voters who receive the national message with localized content promoting the name and campaign website URL of each of the candidates running for office in a voting district of the message-recipient, based on the location of the message-recipient.

Another objective is to use AI to more intelligently reach, inform and persuade voters about the candidates and issues of the day in a preferred communication format of a short-form text-based message or a documentary video, and to curate content, leverage feedback, make data-driven recommendations to potentially increase voter turn-out on Election Day, and increase donations to candidates and social causes, all at a fraction of the cost of traditional campaigning methods.

Yet another objective of the present invention is to utilize the extensive reach of social media and make it easy to empower voters to create their own viral messages or disseminate/share celebrity-sent or political party-sent candidate-promoting Get-Out-the-Vote messages and political Issue-promoting Donation-Request Messages, thereby enabling concerned voters to become voter activists, virally sharing the messages with as many potential voters as possible to foster a more inclusive and representative democratic system.

Another objective of the present invention is to enhance voters' awareness regarding a candidate's opinion and stance on the Issues of the Day, and the candidate's proposed solutions for the problems/issues that voters care about, giving voters a reason to vote for a Candidate because that candidate promises to fix the problems that local voters care about.

Additionally, the present invention aims to increase a candidate's recognition to increase voter familiarity, increasing motivation to get-out-the-vote for the candidate.

SUMMARY OF THE INVENTION

It will be understood that this disclosure is not limited to the particular systems, and methodologies described, as there can be multiple possible embodiments of the present disclosure which are not expressly illustrated in the present disclosure. It is also to be understood that the terminology used in the description is to describe the particular versions or embodiments only, and is not intended to limit the scope of the present disclosure.

In accordance with an aspect of the present invention, a computer-implemented system for generating political messages for social media is disclosed, the system interfaced with a Knowledge Base, the system comprising a user interface receiving one or more inputs like a political candidate's name and a "for-or-against" selection indicating support or opposition of that candidate, at least one pre-trained large language model (LLM) configured to receive the one or more inputs, the large-language model configured with in-context learning with examples from data in the Knowledge Base having data categories including both political issue-oriented and candidate-oriented resources, such as local and global news, local/state/federal government statistics, public census/voter opinion polls, social media messages, comment sections of news and social media platforms about the issue, and each candidate's position/stance on and related to the issue, as disclosed by the candidate in candidate's campaign website, in candidate's own words, speeches, press release and previous legislative voting records regarding the issue, a pre-trained embedding model for embedding generation, wherein the pre-trained embedding model is configured to select semantically similar parts of the politician's profile or statistics and provide contextual information related to the politician to the at least one pre-trained LLM. The LLM is configured to create messages based on user-chosen message topics/issues, candidate names, and message modifiers to personalize the user-created draft messages with subsequent draft message modifiers as needed by the user to create a personalized final draft message approved by the user incorporating the message issue, themes, tones, and other input by and to the personal satisfaction of the user, and an AI Message Generator combining information from the large language model, using unsupervised and supervised learning techniques, to create political messages for distribution by the user via email, SMS/text-messaging and social media messaging platforms, wherein the LLM is configured to carry out a plurality of customized tasks, including information filtering, profile creation, and knowledge extraction from the Knowledge Base, based on one or more predefined custom-made examples.

In an embodiment, the Text-to-Audio Narrated Video Message Format includes video segments and animation sequences, ensuring that image searches encompass both static images and dynamic content.

In an embodiment, the AI Message Generator includes a Message Distribution Localizer, customizing messages based on a recipient's IP/MAC Address/GPS or user-input street address or Zip Code, enabling identification of the user's location to determine its associated local, state, and federal election voting districts for listing the names of the Candidate(s) running for office in upcoming elections in the associated voting district of the message recipient.

In an embodiment, the LLM with in-context learning comprises a Voter Profile Integration module aggregating voter opinions on trending Issues, voter age range, party affiliation, state legislative and federal Congressional voting district location, voter contact information, and voter donation information/connection to online/mobile payment services.

In an embodiment, the LLM with in-context learning includes an Issue Profile Integration module determining trending national and local issues based on search-engine search results, analytics, local and national online news resource searches, including legislative news and legislative voting history databases about the Issues In an embodiment, the LLM with in-context learning includes a Candidate Profile module utilizing search-engine semantically similar search-results of Knowledge Base to match the candidate's name with trending Issues to determine the candidate's positions/stances/comments on the Issues/local problems that voters care about In an embodiment, the Candidate Profile module compiles information about the candidate, and the candidate's inferred and stated political stances and solutions to the Issues of concern to voters, as disclosed on the Candidate's campaign website content, social media messages, press releases, verbal quotes/speeches, and legislative votes.

In an embodiment, the LLM with in-context learning includes an automated data retrieval module parsing and retrieving data from select websites, using Large Language Models (LLMs) for information extraction, wherein the data retrieval module scrapes various social media platforms and direct news links for effective data processing.

In an embodiment, the Knowledge Base is user-customizable and allows the addition of websites and user-customizable content/words/phrases with emotional nuance changes to message tone or other user-chosen message modifiers to the user's satisfaction.

In an embodiment, the AI Message Generator provides automated choices based on trending news stories and popular unsolved social/political issues and problems of potential concern to voters.

In an embodiment, the AI Message Generator includes a user-input Issue/subject customization component of an Issue/problem that is of potential concern to the user/voter.

In an embodiment, the AI Message Generator incorporates an Issue-oriented message-targeting component promoting the preferred candidate's stance on, and potential solutions for, the Issue, and may include criticism of the rival Candidate's position on the issue.

In an embodiment, the AI Message Generator includes a promotional call-to-action message component that can be age-based, including the message theme of voter empowerment to appeal to young voters, or the message of patriotic identity to appeal to older voters.

In an embodiment, the AI Message Generator includes a call-to-action links component to promote the local, preferred candidate, which may include the candidate's campaign website URL/links, social media sharing links, polling place location/directions link, voting alarm/reminder (and other voter empowerment tools), and political campaign donations (or donations to online Foundations, Charities, and Non-Profits dedicated to helping the Cause/Issue detailed in the Primary Message Issue component).

In an embodiment, the AI Message Generator comprises a Message Format output to include Text-based Message format, Text-to-Audio Narrated Message format, and Text-to-Audio Narrated Video Message Format, incorporating a method for automatically selecting and determining the number of visual images needed for Text-to-Audio Narrated Video Message Format, based on the length of the original Text-Based Message's narration and an average image-screen-duration during playback.

In an embodiment, several images required to accompany the length of the narration are automatically selected based on at least two of the following sources of images for the user to re-edit:

Priority use of the Statistical Images, graphs, charts, and tables from the Knowledge Base used in the creation of the Text-based Message;
   AI/Machine Learning Interpretation of the meaning of the sentences in the Message; and
   Image Search Engine search-results using the Message's Issue and the Message's Words/Phrases as the Search Terms for the image searches.

In an embodiment, the AI Message Generator is configured to alter or refine messages based on additional online search terms or user input.

In an embodiment, when a user/voter forwards the message containing a National Issue message component and a Local Candidate Call-to-Action localized message component, the localized Call-to-Action message content seen by the Message Recipient is different for each message recipient, based on the message recipient's location for promoting the Candidate running for office in the message recipient's voting district.

In an embodiment, the LLM receives user input of Message Modification Choices through user input, storing data on a server, and connecting a Knowledge Base.

In an embodiment, the user input includes Drop-Down Menu choices including a Message Issue/Topic Prompt, Message Theme Prompt, Message Tone Prompt, and an Optional Location Prompt, wherein the system utilizes an AI Text Generation Algorithm for producing statistically-factual and emotionally-persuasive messages.

In an embodiment, the Message Distribution Localizer comprises a Customization Module for applying desired tone, theme, and custom user message-modification instructions to improve the draft message according to the satisfaction of the user, based on one or more user inputs/prompts/modifications.

In an embodiment, the system comprises a storage mechanism for users to save generated messages as Drafts and User-Approved Messages by Message Draft identification number #.

According to another aspect of the invention, a computer-implemented method of training a neural network for Political Election Candidate Advocacy Messaging comprises Collecting a Knowledge Base set of Issue-oriented News and Commentary, applying searches of Candidate Names in the Knowledge Base/database, including searches of government websites, Candidate campaign updates, and opinion polls (to determine Candidate's positions/stances and solutions, if any, on the Issues), and creating training sets and training the neural network in multiple stages, adapting to evolving contexts and user preferences to create messages to the satisfaction of the user.

In an embodiment, the neural network dynamically adapts to user queries, political landscape changes, and real-time data integration.

In an embodiment, the neural network adapts its training based on the specificity of user queries to generate nuanced political messages.

A further aspect of the invention includes a computer-implemented method for identifying political representatives associated with a specific locality, comprising determining a user's geographical position, utilizing extracted geo-location data to identify the corresponding voting district, matching the identified voting district with current candidates based on real-time candidate profile database integration, and maintaining an up-to-date database of candidates and their districts.

Another aspect of the invention includes a method for generating political messages using an AI-based system interfaced with a Knowledge Base over a network, the method comprising receiving user inputs for a Political Candidate's name and "for-or-against" support/opposition indication, conducting searches using the Knowledge Base with Issue-oriented data categories, like news, news comments, government website references, census/voter opinion polling, Issue-oriented statistical data, candidate websites, and legislative voting records, utilizing a large language Model with in-context learning to process information from online sources and compose political messages, considering user-chosen issues, candidate names, message themes, and message tones, and customizing and localizing the message content based on the recipient's computer or Smartphone's IP/MAC Address/GPS or user-input address to determine a location of the Message Recipient, matched to corresponding local, state, and federal voting districts and the official candidates running for elected office in those voting districts.

In an embodiment, the process further comprises semantic search-based algorithms for conducting searches.

A further aspect of the invention includes a computer-implemented political messaging application, comprising a Voter Profile Database containing opinions on social problems and issues, an "Issue of the Day" Profile Database comprising local and national voter concerns about problems that need to be fixed, a Candidate Profile Database storing specific quotes, comments, news coverage, political positions, and stances on the issues made by political candidates on social media, an AI Message Generator combining information from the Voter Profile, Issue of the Day Profile, and Candidate Profile to create time-relevant and location-relevant daily messages, and a Message Distribution Localizer for social media linking and customizing messages based on time and the recipient's location.

Various objects, features, aspects, and advantages of the inventive subject matter will become more apparent from the following detailed description of preferred embodiments, along with the accompanying drawing figures in which the same numerals represent like components.

BRIEF DESCRIPTION OF THE DRAWINGS

Non-limiting examples of the present disclosure will be described in the following disclosure with reference to the appended drawings, in which.

DETAILED DESCRIPTION OF THE DRAWINGS

Some embodiments of this invention, illustrating all its features, will now be discussed in detail. The words "comprising," "having," "containing," and "including," and other forms thereof, are intended to be equivalent in meaning and be open-ended in that an item or items following any one of these words is not meant to be an exhaustive listing of such item or items, or meant to be limited to only the listed item or items.

It must also be noted that as used herein and in the appended claims, the singular forms "a," "an," and "the" include plural references unless the context dictates otherwise. Although any systems and methods similar or equivalent to those described herein can be used in the practice or testing of embodiments of the present invention, the preferred, systems and methods are now described.

Legislative measures enacted by politicians have, in certain instances, made it more challenging for local, state, and U.S. citizens to participate in the democratic process. Consequently, elected representatives may not fully reflect the preferences of the majority of citizens, resulting in a governance system where decisions are made by a minority.

This lack of proportional representation has created a pressing social need for a more effective and innovative approach to motivating the majority of citizens to participate in the electoral process.

The present invention discloses an innovative platform that addresses a technology-driven solution to address the challenges associated with low voter turnouts that empower voters to mobilize their social networks effectively. The aim is to bridge this gap by utilizing the extensive reach of social media to empower voters to virally disseminate Candidate-promoting Get-Out-the-Vote messages and political Issue-promoting Donation-Request Messages, thereby fostering a more inclusive and representative democratic system.

Figure 1:
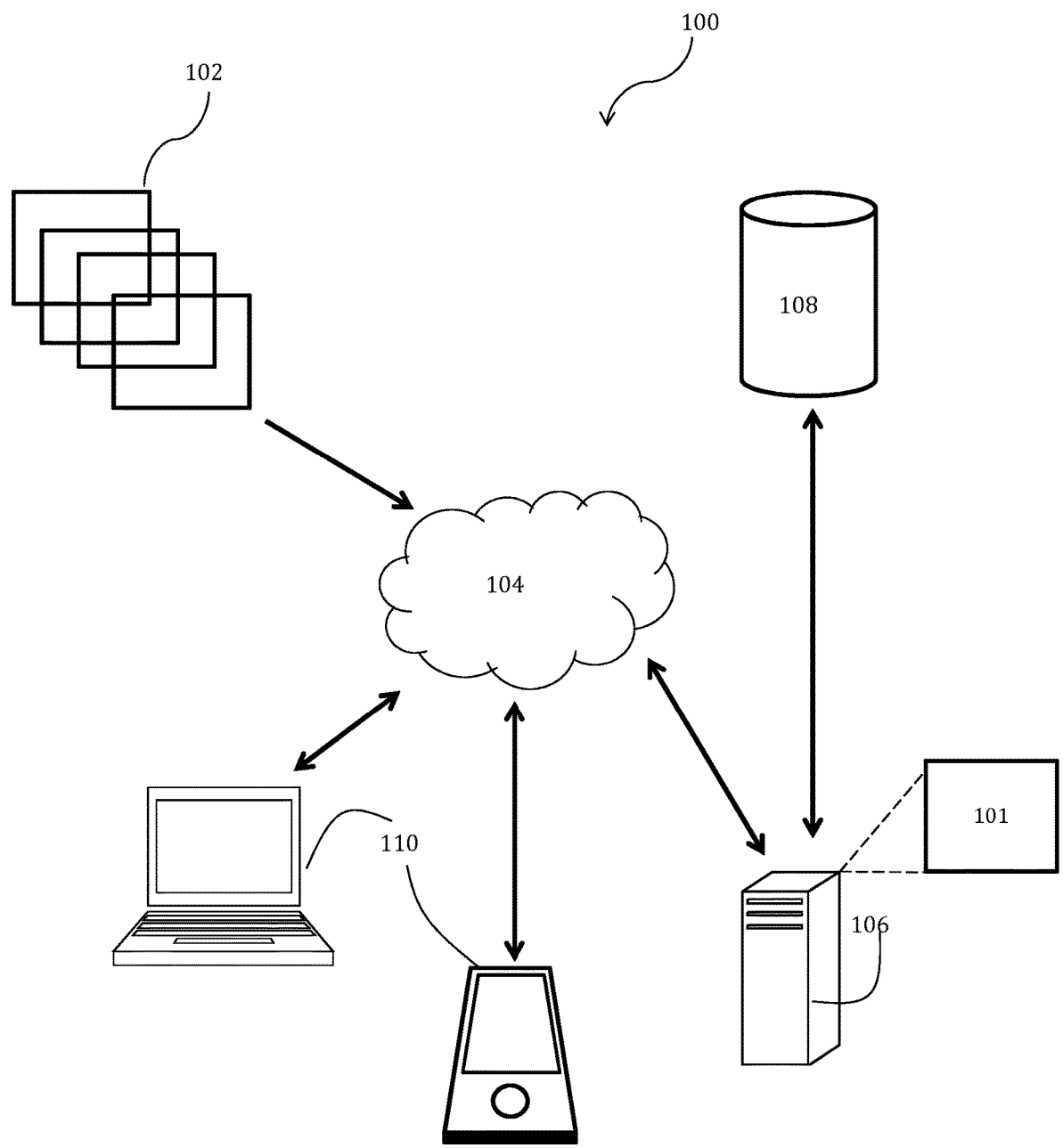
FIG. 1 illustrates an exemplary network diagram for implementing a computer-based system for AI-enhanced Get-Out-the-Vote political candidate message creation and distribution system, according to an embodiment of the present invention.

FIG. 1 illustrates a network diagram 100 for implementing an AI-based system 101 (hereinafter, the system 101) for an AI-assisted message creation and distribution system to increase voter turnout. As shown, multiple user devices 110-1, 110-2, . . . , 110n (collectively referred to as 110) may be available to communicate with a server 106 over a network 104, wherein the server 106 may host the system 101. The system 101 may have its own dedicated storage and processing capabilities. In another embodiment, the user device 110 may be executing a digital assistant application (not shown), which can be a computer-based software application or a web application. The digital assistant application can communicate with, or form a portion of, the system 104. For example, the user devices 110 may be used by a candidate 110-1, a voter 110-2, any citizen in general 110-3, and the like who would like to get the details of the specific candidates running for elections, or their opinions on certain issues to receive data from, or send data to, the server 106. This distribution of server 106 amongst the various stakeholders may be provided, for example, by way of a distributed computing network having several devices under the control of the ecosystem members, and running all or a portion of the system 101 while interconnected by the network 104. The stakeholder inputs may encompass public content and comments, such as opinions in support or opposition of the particular candidates.

In an embodiment, server 106 may be a remote server or a cloud server and is configured to access a plurality of databases 108 to fetch industry-specific updates and information in real-time. The communication network 104 pertains to either a wired or wireless system utilized for data transmission. The network 104 facilitates seamless communication and data exchange between the user 110 and the server 106. The server 106 is adapted to store training dataset 108 which helps the system 101 to learn automatically using machine learning.

In an embodiment, system 101 is configured to handle and analyze user queries received as inputs and ensures efficient interaction and information flow. System 101 is hosted on server 106 which multiple users can access through the web application on their user devices 110. To leverage the functionalities provided by the system, users are required to register with the web application from their respective user devices 110, providing necessary details, including personal information and contact details. Upon registration, users undergo authentication processes to verify their identity. Authorized users gain access to the full functionality of the system.

In an embodiment, the users access the system 101 by registering to the system from their respective user devices 110 through the web application which may include various modules including Politician Profile Creation Module, Voter Profile Database Module, AI Message Generator Module, and Location-Based Message Distribution Module offering holistic insights, efficient messaging, and a user-focused experience for unparalleled engagement with political landscapes.

In an embodiment, the multiple users registered to the system 101 hosted on the server 106 may access the system 101 through the secured network connection 104, the users can register to the system 101 through the web application from their respective devices 110. System 101 access the user's location from the user's devices 110 and accesses the location of the user through any of the methods by establishing a connection between the user's MAC Address, web IP, or GPS Smart Phone position to determine the User's location at the discretion of the user.

In an embodiment, system 101 generates an extensive Voter Profile Database, systematically capturing and analyzing the opinions of individual voters on a myriad of social problems and contemporary issues. By harnessing advanced AI algorithms, system 101 creates a nuanced understanding of each voter's perspectives, forming a comprehensive database 108 that serves as the foundation for personalized messaging strategies for the users registered to system 101 through their respective user devices 110. There may be a plurality of databases generated including a database that encompasses user details and donation information, a Candidate Profile Database as a reservoir of specific quotes, comments, positions, and stances adopted by political candidates fostering a holistic candidate profile that not only informs messaging strategies but also serves as a secure and authenticated platform for personalized political engagement.

In alternate embodiments, the AI-based system 101 uses large language as well as semantic search-based algorithms to search known databases such as, but not limited to, major online news media, blogging databases having reader comments, social media databases having discussions, opinions, posts, legislative voting records, and other official sources to generate a Knowledge Database 108. The purpose of Knowledge Database 108 is to comprehensively store data about political candidates and issues relevant to their voting districts in a structured manner for displaying to users and generating a political message by the system 101.

System 101 includes a tool that supports custom information search and extraction from a set of specified websites, enhancing the breadth of data collection. Various data extraction libraries such as Selenium, Beautiful Soup, request packages in Python, and the like are employed to automate the parsing and retrieval of data from select websites, thus ensuring accuracy and effectiveness in data extraction.

In an embodiment, the system incorporates an In-Context Learning technique which facilitates the LLM to perform task-specific information extraction based on the provided examples and instructions. This process enables the model to understand the intricacies of political discourse, discern contextual nuances, and accurately extract information essential for subsequent tasks.

In a further embodiment, the LLM is configured to generate a text embedding. For example, when the user selects an issue (let's say abortion), the LLM does not take the full politician profile, as it would be very expensive and tedious to process for the LLM. Towards this end, the LLM encodes in the form of a vector representation of the issue and the politician's profile and utilizes only those parts for in-context learning for the LLM message creation whose semantic similarity with the issue is significant. Thus, the LLM may have custom definitions of what constitutes significant or "big enough".

As an example, a news item, a tweet, or any piece of text goes through the following flow:

Raw data->Instruction+LLM->Extracted Custom Data->Instruction+LLM->Part of politician's profile.

Then given an issue->text embedding->get semantically similar statistics, get parts of politician profile which are semantically similar (with encodings provided using the same model)->getting selected data->LLM+instruction+all other information such as tones, quotes, theme, and the like->Or about anything else.

Figure 2:
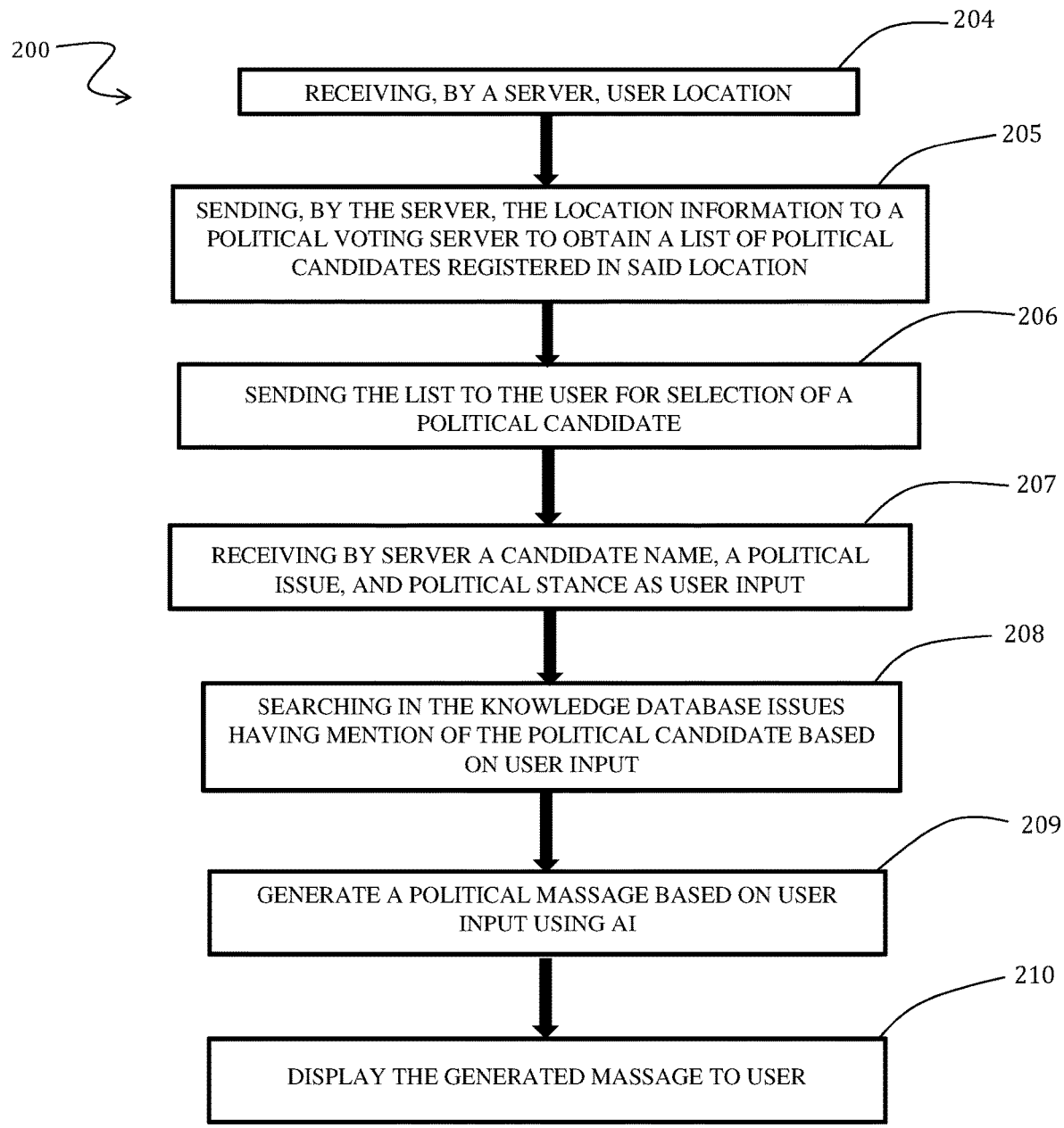
FIG. 2 illustrates a detailed flow diagram of a method to facilitate the working of an AI-assisted system for increasing voter turnout, according to an embodiment of the present invention.

In an embodiment, FIG. 2 illustrates a Flow Diagram 200 illustrating the workflow of system 101 depicted in an exemplary embodiment. The method or process 200 for generating a political message includes step 204 as a first step where the user via a communication network registers on the system 101 and shares his/her location with the system 101. In step 205, system 101 shares the location information of the user via said communication network to a voting server or an election server, wherein the details of the political candidates for a country are stored, and automatically identifies all the political candidates running for election from the users' location and gathers the relevant information regarding the political candidate. In step 206, system 101 transmits a list of political candidates identified by system 101 that are to be displayed on the user device 110 with the profile for each candidate containing all relevant information. In step 207, the user provides the name of a political candidate selected from the displayed list at step 206. The user also provides a political issue and a political stance of the user, i.e. whether the opinion of the user is against or for the selected issue, to the system 101. System 101 upon receipt of the inputs provided by the user in Step 207, retrieves information having the name of the political candidate and one or more statements with regard to the political issue made by the political candidate such as one or more comments, posts, and the likes stored in the Knowledge Database 108.

In an alternate embodiment, if the system 101 does not find the candidate's name and/or any comments related to the issue provided as input by the user, the system is configured to retrieve and process information related to the candidate's statements and/or opinions about the political issue in a structured manner, by leveraging and LLM for extracting and parsing information from various websites, such as news websites, blog posts, social media posts, and the likes. In a further embodiment, system 101 is configured to compare the update the Knowledge Database 108 based on said newly processed information. In yet another embodiment, process 200 may include comparing the information gathered by system 101 in the above steps with the information stored in the Knowledge Database 108 to maintain the relevance and authenticity of the database.

In Step 208, system 101 is configured to generate a political message, using AI and in-context learning techniques, based on the information obtained with regard to the political candidates' name, and the statements made about the political issue by the said candidate, along with the political stance specified by the user. In Step 210, the generated message of Step 209 is transmitted, via a communication network, to the user device 110.

In an embodiment, the gathering of relevant information regarding a political candidate in step 205 may include but is not limited to, the candidate's name, address, website, funding source, and any information that the candidate has voluntarily shared with the election server to be made public. In an embodiment, the election server wherein the details of candidates running for election are stored may be at a state-level server and/or a Federal server.

Figure 3A:
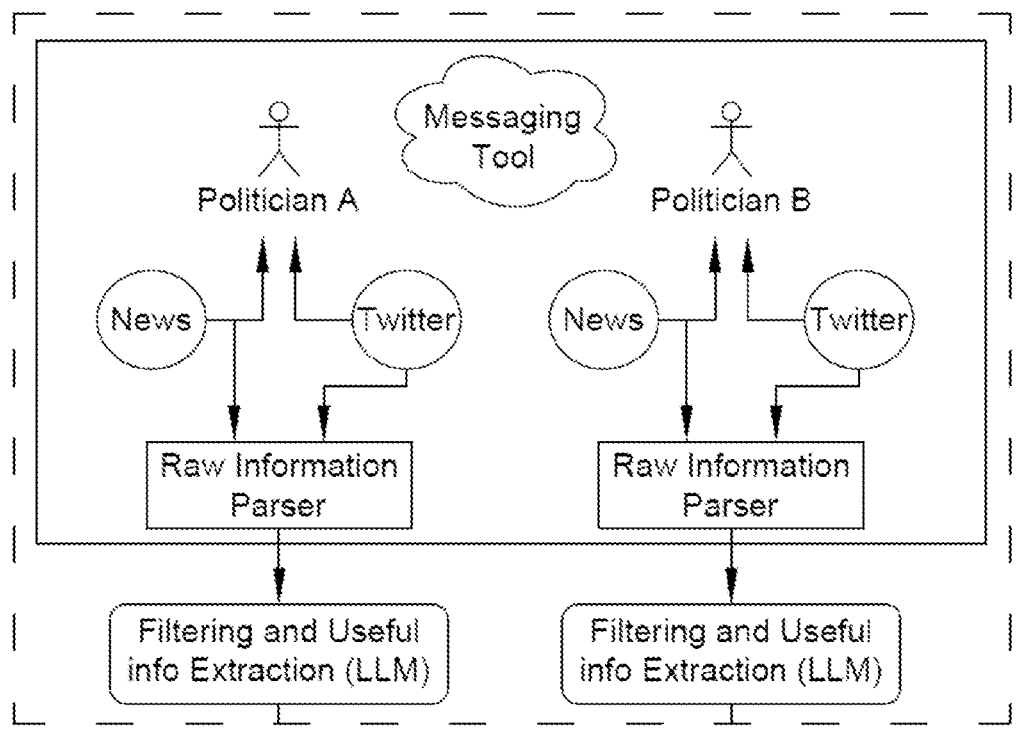
FIGS. 3A-3B illustrates a flow diagram for parsing and retrieving data from websites, according to an embodiment of the present invention.

FIG. 3A illustrates a flow diagram of the system parsing and retrieving data from websites, according to an embodiment of the present invention.

System 101 uses a combination of AI-driven data retrieval from diverse sources using a pre-trained LLM and pre-trained embedding model algorithms and their combinations to retrieve the relevant data, dynamic Voter Content generation, and user customization to ensure relevance and accuracy in delivering political information to users. System 101 uses various data retrieval and parsing tools such as, but not limited to Selenium, Python, and the like, to automatically parse and retrieve data from a plurality of news websites such as, but not limited to, CNN™, Fox News™, MSNBC™, and the likes, and social media websites such as, but not limited to, Twitter™, Facebook™, and the likes, related to the political candidates. Said system 101 is configured to dynamically accept links to the official social media pages of a politician and/or the base search page of a news website, and extract raw information from the webpages.

For example, a plurality of modules are configured to extract relevant information from one or more websites such as a dynamic URL input module that accepts URLs to a politician's official social media page or the base search page of supported news websites. Further, the system uses in-context learning, where custom examples are presented to the network to perform specific tasks, such as extracting information from tweets or news articles, scraper modules that are configured for websites to ensure accuracy and effectiveness in data extraction; Infinite Scroll Handling module configured to automatically scroll down on websites or platforms that use infinite scroll mechanisms (such as Twitter™) to fetch more content; data extraction module that is configured to extract the raw content/information; user authentication module for authenticating and logging in social media accounts. An exemplary workflow of the above data extraction is provided below.

1.  Initialization : The camping (AI GM) provides either a Twitter link or a news website link. #TODO candidate website
2.  URL Detection : The system identifies the website from the given URL to determine which custom scraper to deploy.
3.  Twitter Flow : If Twitter is detected, the scraper logs in using the provided credentials, begins scrolling to capture tweets related to the politician, and extracts raw tweet data (content, timestamp, likes, retweets, etc.)
4.  News Website Flow : If a news website is detected, the scraper searches for the politician's name, and handles pagination or infinite scroll to capture relevant news links. For each detected news link, it navigates to the page and extracts raw news data (headline, content, author, timestamp, etc.)
5.  Data Aggregation : Once all data is collected, it's aggregated into a structured format suitable for further analysis or storage.
6.  Output : The aggregated data is then returned to the user or saved to a specified location.

In an exemplary embodiment, the technologies and libraries used by the system 101 may include selenium with Python™, compatible web drivers for various browsers, for example, ChromeDriver for Chrome™, GeckoDriver for Firefox™), beautiful soup to assist in parsing HTML content to extract data efficiently, python library for direct requests, and Python™ as the programming language for building the component.

Figure 3B:
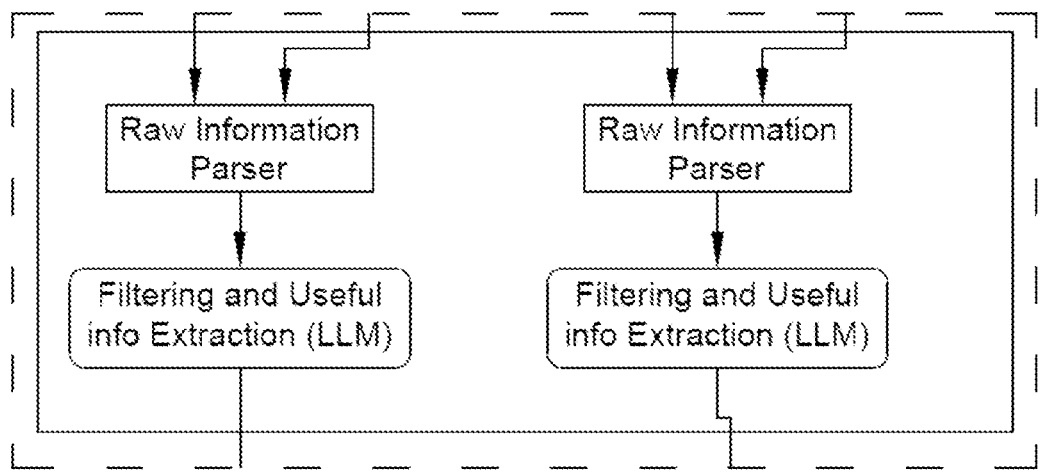

FIG. 3B illustrates an exemplary workflow for parsing and retrieving data from different websites, according to an embodiment of the present invention. In an embodiment, system 101 is configured to generate one or more prompts specific to the details of the political candidate within system 101 to create a check on the gathered filtered information so that the information scope and relevancy are maintained. Said prompts may be related to the determination of the topic/issue related to a news story; followed by identifying if the determined issue is a political issue; determining the solution proposed by a political candidate identified in the news story; determining the opposing candidates' name and his/her solution; determine the impact of both the solution; identifying any legislative act mentioned in the news story; determine the party being represented by the political candidate; determine the stance of the candidate and the party and the likes. The system may retrieve, for the user, relevant information from the filtered information stored in the Knowledge Database 108 as described herein below:

"topic": Identify the main topic of this news story.

"political_issue": Identify any issue related to political or general population interests (taxes, debts, healthcare, guns, bills, etc.) mentioned in the news story?

"solution_proposed_by_{person_name}": Summarize {person_name}'s proposed solution for the identified issue, if any.

"competitor_plan": Summarize the plan or solution proposed by {person_name}'s competitor(s), if any. Distinguish clearly between {person_name}'s propositions and those of others.

"plan_impact": If a solution from {person_name} or his competitor exists, evaluate its potential environmental, financial, and human effects.

"person_inference": What can we infer about {person_name} from this news story?

"legislative_stance": Are there any specific policies or legislative actions mentioned that {person_name} supports or opposes?

"supporters_and_opponents": Does the news provide information about who supports or opposes {person_name} on these issues?

"public_reaction": What are the public responses or reactions to {person_name}'s positions, as indicated in the news?

"comparison_with_opponents": Does the news compare {person_name}'s positions with those of his potential opponents?

"party_stance": Does the news mention {person_name}'s party's stance on these issues? If so, how does {person_name}'s position compare?

"controversial_aspects": Are there any controversial aspects to the issues or {person_name}'s position on them? "proposal_effects": What are the effects of {person_name}'s proposal? Enumerate effects on environment, national debt, taxes, healthcare, etc.

"fact_checkable_statements": Identify any statements from or about {person_name} that can be fact-checked. The statement has to be a quote of {person_name}.

In an embodiment, the users registered to the system 101 through the user devices 110 accessing the system through suitable web applications configured to connect with the server 106 having the system 101. The user may use the Politician Profile Creation module of system 101 which provides political analytics, contributing to the efficient analysis and profiling of politicians based on diverse and dynamic news data. Said module is displayed on the user device 110 through the web application and is configured to receive structured information by utilizing advanced machine learning techniques to group data into coherent topics to generate detailed profiles for politicians, thereby capturing nuanced insights for generating targeted messages by the system 101 and providing via the communication network 104 on user devices 110.

In an embodiment, the Profile Creation module employs the LLM and embeddings through pre-trained networks (utilizing the Sentence Transform library) to effectively group news items based on their extracted topics. Leveraging a Large Language Model (LLM), the system assembles comprehensive profiles for politicians by parsing aggregated information. This process encompasses various facets such as key issues, political stances, rival views, public reactions, and more.

Figure 4A:
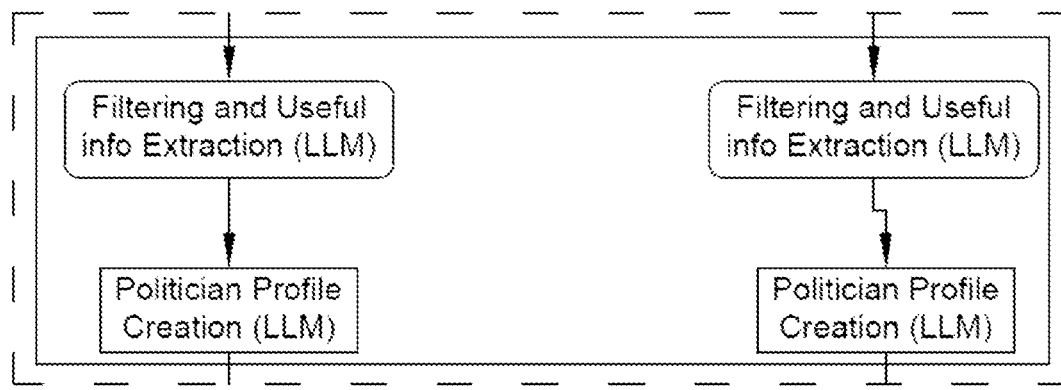
FIGS. 4A-4D illustrates a flow diagram for different modules of the web application of the system displayed on the user device, according to an embodiment of the present invention.

The workflow, key features, and technologies used in the profile creation module are described here below. However, the technological description provided here is to give a general description of the technical composition only as shown in FIG. 4A. Said Politician Profile creator and aggregator receives structured information, and groups them by similar topics using machine learning techniques, thus creating detailed profiles for politicians. These captured profiles provide comprehensive insights about each politician based on the aggregated news data, enabling quick interrogations and representing the base for the targeted message formulation. The profile creator and aggregator module includes but is not limited to Topic Grouping that uses clustering such as K-Means alongside embeddings via pre-trained networks, using the SentenceTransform library, to group news items based on their extracted topics. Profile Creation module configured to assemble detailed profiles of politicians based on the aggregated information. Said module utilizes an LLM to achieve this task. As an example, the various technologies and Libraries used in the present invention, but not limited to, Python as the primary language for building the component, Scikit-learn, and Sentence Transformer in Pytorch for grouping topics, LLM for grouping news data and creating the actual profiles. An exemplary workflow is provided below.

1.  Data Input : The component receives structured information from the previous step.
2.  Topic Grouping : Using machine learning embeddings and similarity metrics, news items are grouped by topics.
3. ** Profile Assembly* *:
   Each politician's aggregated data is parsed.
   For each identified topic related to the politician, the database structure is populated.
   Key issues, political stances, rival views, public reactions, etc., are filled into the profile.
   This process repeats for all politicians in the dataset.
4.  Database Storage : The assembled profiles are stored in a database, allowing for quick retrieval and interrogation.

In an embodiment, the system features the Politician Stance Extractor, a module that transforms user queries into concise insights about a politician's stance on specific topics or events. This module excels in handling both broad topics and specific queries, utilizing Natural Language Processing (NLP) techniques for query understanding. The system seamlessly integrates custom query handling, profile segmentation, and Large Language Model (LLM)—assisted answering to deliver precise and relevant information to users. Through a meticulous workflow involving query encoding, profile selection, segmentation, LLM processing, and output delivery, users can effortlessly obtain politicians' stances. The module addresses challenges related to query ambiguity, accuracy, and data freshness, ensuring a sophisticated and reliable tool for users seeking prompt and accurate insights into political stances.

Figure 4B:
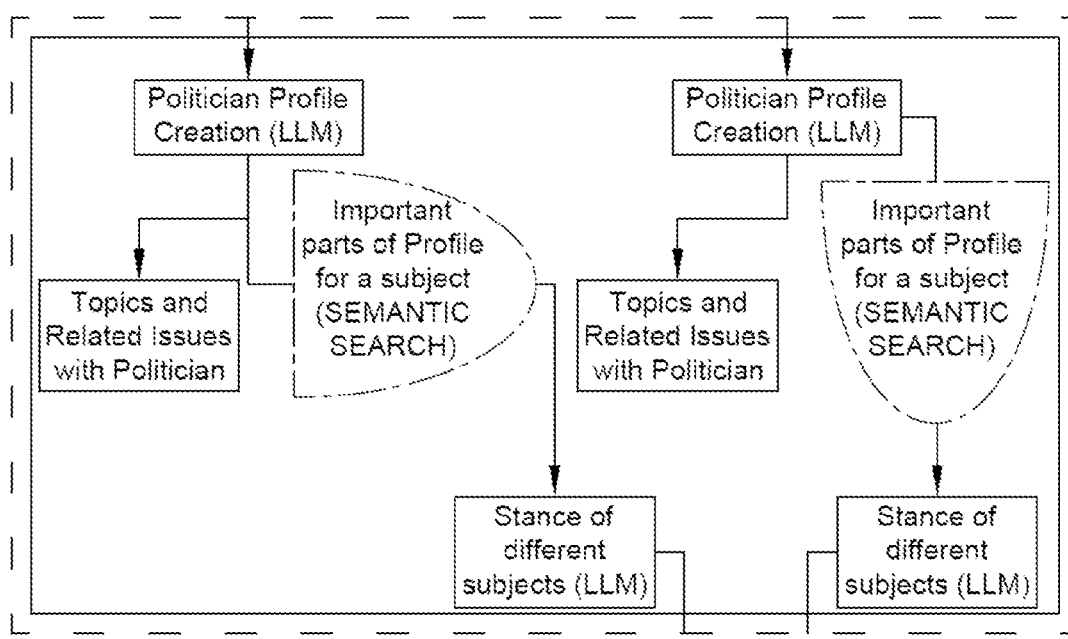

For example, the key features, workflows, challenges, and considerations in the implementation of the politician stance extractor are described here below and shown in FIG. 4B The Politician Stance Extractor allows users to input custom queries related to a topic or specific event. It encodes these queries, selects relevant politician profiles, segments the profiles into subsections, retrieves key sections, and then uses an LLM and various Machine learning algorithms to provide a concise answer about the politician's stance on the queried issue. However, the technologies mentioned below for example only give an overview of the technological implementation. The Key Features of this module include but are not limited to Custom Query Handling configured to process both broad topics like "healthcare" and specific events or locations like "Uvalde school" from news resources, Profile Segmentation module configured to select relevant sections of the politician's profile based on the query. An LLM-Assisted Answering module that leverages a Large Language Model, by which the system extracts the politician's stance on the queried topic. As an example, the technologies and libraries used in the present implementation include, but are not limited to, Python as the primary language for building the component; LLM for understanding the query, segmenting profiles, and deducing the politician's stance; Pytorch for encoding and understanding user queries. Below is an exemplary Workflow.

1.  User Query Input : The user inputs a query related to a topic or specific event.
2.  Query Encoding : NLP techniques (embeddings from pre-trained general-purpose models) are used to understand and encode the user's query, determining its essence.
3. ** Profile Selection
    The encoded query is matched against the stored politician profiles in the database.
    Relevant profiles that might contain information about the query are selected.
4.  Profile Segmentation:
    Profiles are segmented into subsections.
    Only the keynotes and most relevant subsections related to the query are retained. Here we use cosine similarity. This ensures concise and focused information.
5. ** LLM Processing*
    The segmented profile information is fed to the LLM.
    The LLM is asked to process only the provided segmented profile and deduce the politician's stance on the issue.
6.  Output Delivery : The LLM's response, which is the politician's stance on the queried topic, is presented to the user.

Figure 4C:
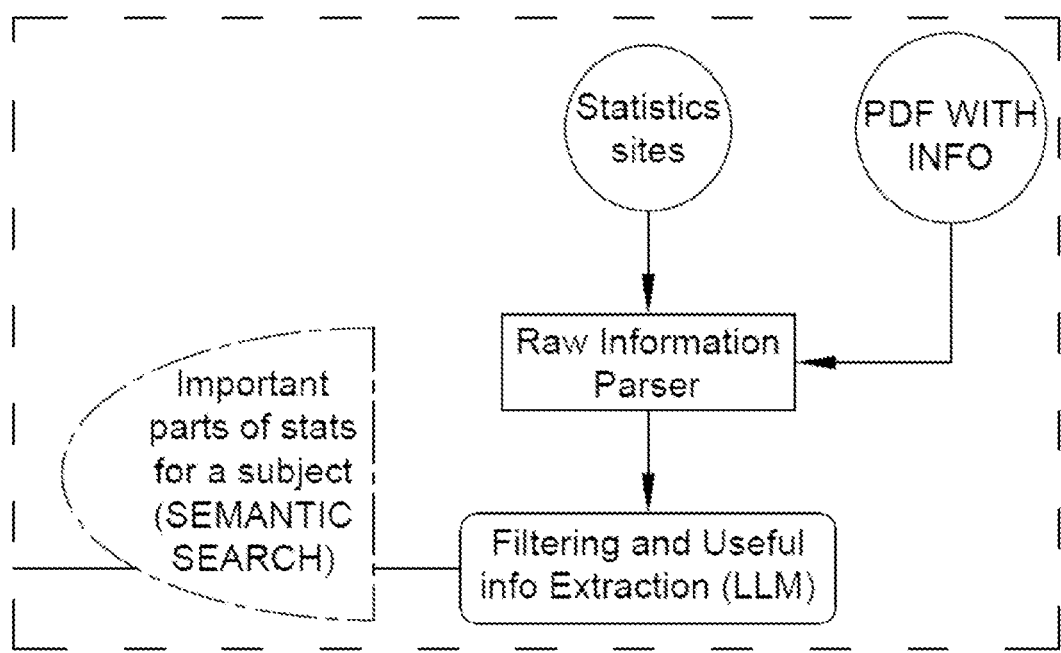

In an embodiment, system 101 incorporates a module Statistics Parser, a robust software module designed for extracting numerical information from diverse sources, with a focus on PDFs and websites. Leveraging various scraping libraries such as Beautiful Soup and Selenium for web parsing and specialized PDF extraction tools, the parser gathers raw data, which is subsequently processed by a Large Language Model (LLM) for classification, filtering, and selection of pertinent statistics with the automated web scraping, PDF data extraction, and LLM-assisted filtering. The workflow involves source identification, data extraction from web and PDF sources, preliminary data cleaning, LLM processing, and structured storage of relevant statistics addressing challenges related to dynamic websites, PDF variability, accuracy, data freshness, and handling rate limits or CAPTCHAs for extracting, filtering, and storing critical numerical data from various sources, ensuring its accurate functionality for downstream analysis or decision-making processes. The working, key features, and technological description statistics parser module are provided here as shown in FIG. 4C.

The Statistics Parser module is configured to extract numerical and related information from a range of sources, particularly PDFs and websites. The module, using a combination of Selenium for web parsing and specialized tools for PDF extraction, gathers raw data. The extracted raw data is then processed by a Large Language Model (LLM) to classify, filter, and select relevant statistics for further use. The Key Features of the module include but are not limited to a Web Parsing module with Selenium configured to automate the scraping of websites to gather statistical data, a PDF Extraction module configured to extract statistical data from PDF documents, an LLM-Assisted Filtering module that is configured to use an LLM to discern the relevance and usefulness of the gathered statistics.

In an exemplary embodiment. various technologies and libraries used in the present module are, but not limited to, Python as the primary language for building the component; Selenium for web scraping and data extraction from web sources; PyPDF2 for extracting data from PDF documents; LLM for classifying and filtering the extracted statistical data; Dynamic Websites for websites with dynamically loading content that may pose challenges for standard Selenium scripts; PDF Variability for PDFs that may vary in their structures, making universal extraction challenging; Accuracy for ensuring the accuracy and relevance of the extracted data is paramount since misinterpretation can lead to incorrect conclusions; Data Freshness for Periodic re-scraping or re-checking might be necessary to keep the statistical data up-to-date; Rate Limits and CAPTCHAs for some websites that may have measures against frequent automated requests, such as handling CAPTCHAs or respecting rate limits is essential. A sample Workflow of the module is provided below.

1.  Source Identification : The system is directed towards specific URLs or given PDF documents containing potential statistical data.
2. ** Data Extraction *:
     For Web Sources : Selenium scripts navigate the targeted websites, scraping data from tables, infographics, or text content.
     For PDFs : Specialized libraries (like PyPDF2 or PDFMiner) parse PDF contents to extract statistical information.
3.  Preliminary Data Cleaning : Basic cleaning operations are applied to the raw data to remove any obvious noise or irrelevant information.
4.  LLM Processing :
    The cleaned data is passed to the LLM.
    The LLM classifies the data, determining its relevance and importance based on predefined criteria.
    Useless or irrelevant statistics are filtered out.
5.  Output Storage : The selected relevant statistics are stored in a structured format in a database or passed on to subsequent modules for further processing.

In an embodiment, the system incorporates a Political Messaging Engine module. The Political Messaging Engine (PME) module is an innovative software tool that intricately weaves together coherent and targeted political messages by intelligently synthesizing politicians' stances, relevant statistical data, and user-defined settings. With a focus on providing informative content tailored to specific tones, themes, and directives, PME serves the strategic communication goals of political campaigns and discourse analyses.

In an embodiment, the Political Messaging Engine (PME) module includes advanced stance analysis, statistical incorporation, tone and theme customization, and compliance with custom user instructions. The PME workflow involves gathering input on politicians' stances, collecting pertinent statistics, and incorporating additional parameters. The content synthesis phase employs natural language processing to structure messages, considering the optimal use of statistics. Customization steps apply desired tones, themes, and user instructions, leading to the generation of coherent and contextually relevant draft messages. Leveraging LLMs and AI text generation algorithms, along with custom scripting for additional settings, PME ensures the delivery of finalized messages suitable for distribution across various platforms or further review by campaign staff or analysts. Challenges such as ensuring data veracity highlight the engine's reliance on accurate input statistics and stances to avoid potential misinformation.

Figure 4D:
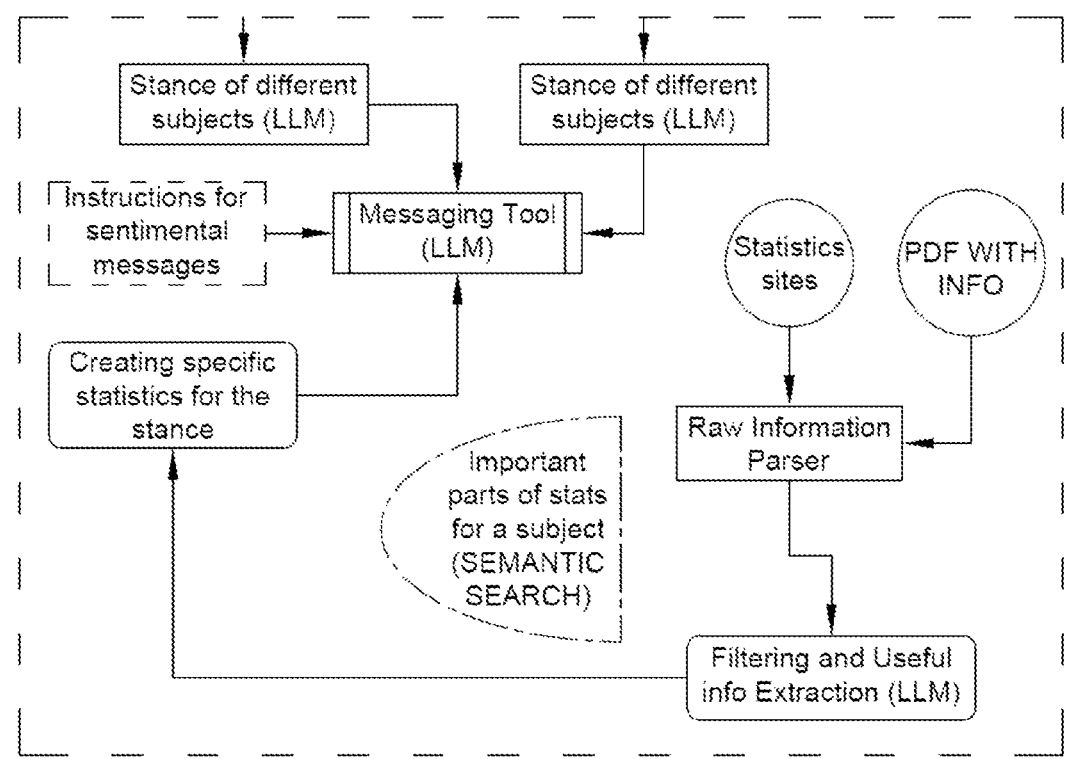

In an embodiment, the present system 101 crafts persuasive political messages, meticulously generated to capture the attention of voters, appeal to their sense of facts, and present practical solutions to pressing issues. By harnessing the potential of social media and AI the messages are generated in a manner as described below and shown in FIG. 4D. The Political Messaging Engine/module is configured to synthesize cohesive and targeted messages based on the input of politicians' stances, relevant statistical data, and a series of additional user-defined settings. This component intelligently crafts messages that are not only informative but also tailored to the desired tone, theme, and directives provided, ensuring that the output aligns with the strategic communication goals of political campaigns or discourse analyses. The key features of this module include, but are not limited to, Stance analysis wherein the module is configured to interpret and integrate the provided stances of two different politicians on a plurality of topics. Another feature of the said module is statistical incorporation for embedding relevant statistical data to support or contrast the politicians' stances. The module is also configured to customize the tone and theme that adapts to the message such as, but not limited to, emotional, patriotism, and the likes, and themes such as, but not limited to showcasing leadership, vote encouragement, community care, and the likes per user instructions. The module is further configured for custom user instructions compliance wherein the module follows specific guidelines set by the user to target particular demographics or address specific points of interest. As an example, the various technologies and libraries used in the present modules may include, but are not limited to, Open-AI LLM for parsing and understanding the politicians' stances and integrating statistics meaningfully, preferably, LangChain; AI Text Generation Algorithms to produce the base layer of the messages that sound natural and are coherent; Custom Scripting for applying additional settings such as tone and theme. An exemplary workflow of the modules is provided below:

1.  Input Gathering :
   Receives the politicians' stances on selected topics.
   Collects pertinent statistics that align with the topics of discussion.
   Accepts additional parameters like tone, theme, and custom user instructions.
2.  Content Synthesis :
   Analyzes the input data using natural language processing to understand context and content.
   Structures the message, considering the best use of statistics to support or compare the politicians' viewpoints.
3. ** Customization* *:
   Applies the desired tone and theme to the message, ensuring the delivery is on-brand with the campaign or analysis purpose.
   Adheres to custom instructions which may include targeting certain demographics, emphasizing particular points, or avoiding sensitive subjects.
4.  Message Generation :
   Generates a draft message that is coherent, contextually relevant, and aligned with the provided data and settings.
   Reviews the message for logical consistency and factual accuracy.
5. ** Output Delivery
   Presents the finalized message in a format ready for distribution across various platforms or for further review by campaign staff or analysts.

In other embodiment, the Political Messaging Engine not only facilitates the creation of messages for every political party and candidate globally but also ensures localization by utilizing local-language news media databases to construct candidate profiles and address issues of local significance. Moreover, the system dynamically adjusts messages based on the recipient's voting district, tailoring the content to display candidates relevant to and running for office in that specific district. The user interface of the messaging tool allows a seamless and intuitive experience for users to select politicians, customize messages based on predefined topics, tones, and themes, and generate impactful content for distribution across various platforms due to which political communication is elevated to a strategic and personalized level, offering a powerful means to mobilize voters, drive engagement, and influence political discourse.

In an embodiment, for example, the system may allow the user to generate and provide various additional user-specific links, issues, polls, and Donation links that the user wants to incorporate into the main message effectively in the following comprehensive approach ensuring that the messages are not only customized but also strategically aligned with the political goals and demographics of the targeted audience, facilitating a dynamic and engaging communication process while also including the specific features user wants to display, as shown below:

AI Message Generator-Serves Issue-related Components to Daily Message Recipients
Today's Message Subject/Issue of the Day/Pro-or-Anti Candidate Message component
Automated Message Choices Based on Trending News Stories and still-popular unsolved
Social and Political Issues with >60% Voter Approvals for a solution
Human User/Input Drop-Down Menu of Issues to Choose
The user enters its terms into a blank message subject box:
Message Target component
Messages promote Preferred Candidate Only Messages also criticize and attack the Candidate's Rival to degrade public opinion Age-Based Call-to-Action Message component—to add the age-appropriate Get-Out-the-Vote message that is the most inspiring and motivating to the two largest blocks of voters:

Younger Voters inspired by messages reinforcing Voter Empowerment to change the world with their votes Older Voters are inspired by messages reinforcing Patriotic Identity and Duty as citizens to exercise their now-threatened sacred rights to have their vote counted.

Call-to-Action LINKS component at the bottom of the message to increase viral connections:

Candidate Website Link-shown to Voter based on GPS, IP, or address location of Voter to determine Voter's voting district and Candidate(s) running for office whom Voter is eligible to vote for Share/Spread This Message and VOTER-ACTIVISM Links (with your Social Media friends and followers to encourage viral effectiveness with links to voters' own social media accounts to send the same message via different platforms.

Help the Cause-Donation Link (Donate to Party or Candidate/Cause/Party/SuperPAC)

In an embodiment, the system incorporates an output message format which provides the user the liberty to generate and distribute messages in multiple formats including a Text-based Message format, Text-to-Audio Narrated Message format, and Text-to-Audio Narrated Video Message Format as per the user.

In an embodiment, the AI Message Generator further incorporates a methodology for ascertaining the requisite number of visual images essential for the Text-to-Audio Narrated Video Message Format. This determination is contingent upon the duration of the original Text-Based Message's narration and a prescribed average image-screen-duration of 3 seconds during playback.

In an embodiment, the system adeptly computes the temporal extent of the original Text-Based Message's narration in seconds and minutes, employing an average spoken text-to-voice enunciation. The User-Selected Image Screen Time augments the user's interaction by allowing them to discerningly choose an average number of seconds for the display of each image during the initial editing cut of the video. This personalized input directly influences the subsequent Approximation of Image Count, where the system precisely calculates the approximate number of images required based on the user-specified average image screen time ensuring a tailored and user-driven video creation process.

In an embodiment, the system Utilizes the Knowledge Base, wherein the system strategically employs issue-related images, graphs, tables, and other visualized statistics sourced from each message's aggregated and saved Knowledge Base ensuring that the visual components of the video are rooted in the specific context and content of the messages created within the system.

In an embodiment, the system further includes an Extended Image Search, where the system autonomously explores additional images, graphics, tables, and visual statistics beyond the Knowledge Base. This expanded search is aligned and synced with the visual relevance to the meaning of the Narrated Message, its theme, and the matched words, phrases, and sentences, further incorporating the external visual elements and enriching the diversity, depth, and viewer appeal of the video content.

In an embodiment, the system also includes video segments and animations as integral components of the image search process. This means that when the system performs an image search, it doesn't limit its results to static images alone but also encompasses dynamic content such as video clips and animation sequences. By expanding the scope of the image search to include these moving images, the system significantly enhances the variety and richness of the visual content, making the final output more engaging and visually appealing.

In an embodiment, the system dynamically generates a compilation of images synchronized with the length of the narration, accounting for the user-inputted average image screen time, thus enhancing the system's ability to seamlessly integrate visual elements with the narrative flow of the message. Users can further modify the screen time length of each image, delete images, and thereby craft revised, user-approved saved videos. Upon saving user-edited videos, the system preserves a library/record of image links/locations for future use in Message Visualizations. This interactive user involvement enhances the adaptability and customization potential of the system.

Another embodiment of the present invention discloses an automated process of compiling and displaying relevant visual images from online resources; graphs, charts, and tables from the Knowledge Base resources used in the creation of the text-based message; and available video-segments from online resources that are combined into a First-Cut Video for which the user can change the screen-time length and order of the compiled images to create an Issue-oriented short-form Documentary-style Video of images that are relevant to the words/phrases/meaning and issue/theme/tone of the text-based message, and timed exactly to accompany the user-selected text-to-voice audio narration or the Candidate's narrative voice.

Through this, the user-creation/production of a message video is simplified by having an automated system to generate for the user an already-assembled video sequence of images to match the narrative text, which the user can re-edit by changing the duration of the images, deleting or adding images, re-ordering images and applying all final edits to the narrated audio track, music soundtrack (if any), image transition effects (pans, zooms, wipes) and onscreen graphical text and video content.

In an embodiment, the user, through his or her smartphone can create an audio or video of the user narrating the messages created by the instant AI Political Messaging system in the user's voice, with the user recording themselves, reading/saying the message on-camera. This inventive step of using the Message as a narrative script to match images that best convey the meaning of the message's words/phrases/sentences effectively closes the loop on the entire messaging process by enabling users to create short video documentaries on the issues being promoted in the messages that were originally composed in text format.

In an embodiment, the Political Messaging Engine is a sophisticated solution for crafting precise and customized political communications, integrating artificial intelligence to deliver impactful messages that resonate with, and motivate, target audiences amidst the intricate landscape of political rhetoric and statistical data.

In an embodiment, AI Message Generator encompasses an additional tertiary message component, incorporating excerpts from Famous Historical Quotes attributed to America's Founding Fathers, foundational documents (Declaration of Independence, Bill of Rights, Constitution, and Federalist Papers), past Presidents, eminent politicians, and celebrities against which the message-recipients may directly compare and contemplate the historical worthiness, stature and fitness of the message-promoted candidate or the opposing/rival candidate. These quotes are specifically selected for their relevance to the message issue or the broader domain of politics, including reflections on the ideal qualities of a President, Politician, or elected representative. The inclusion of thought-provoking quotes about Leadership, Integrity, and Thriftiness serves the purpose of encouraging critical contemplation about the worthiness or fitness of the candidates among message recipients/users.

While for purposes of simplicity of explanation, the illustrated methodologies are shown and described as a series of blocks/steps, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

In the foregoing description, certain terms have been used for brevity, clearness, and understanding. No unnecessary limitations are to be implied therefrom beyond the requirement of the prior art because such terms are used for descriptive purposes and are intended to be broadly construed. Therefore, the invention is not limited to the specific details, the representative embodiments, and the illustrative examples shown and described. Thus, this application is intended to embrace alterations, modifications, and variations that fall within the scope of the appended claims.

The methodology and techniques described for the exemplary embodiments can be performed using a machine or other computing device within which a set of instructions when executed, may cause the machine to perform any one or more of the methodologies discussed above. In some embodiments, the machine operates as a standalone device. In some embodiments, the machine may be connected (e.g., using a network) to other machines. In a networked deployment, the machine may operate in the capacity of a server or a client-user machine in a server-client-user network environment, or as a peer machine in a peer-to-peer (or distributed) network environment.

Moreover, although the present invention and its advantages have been described in detail, it should be understood that various changes, substitutions, and alterations can be made herein without departing from the invention as defined by the appended claims. Moreover, the scope of the present application is not intended to be limited to the particular embodiments of the process, machine, manufacture, and composition of matter, means, methods, and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

The preceding description has been presented with reference to various embodiments. Persons skilled in the art and technology to which this application pertains will appreciate that alterations and changes in the described structures and methods of operation can be practiced without meaningfully departing from the principle, spirit, and scope.

What is claimed is:

1. A computer-implemented system for generating political messages for social media, the system interfaced with a Knowledge Base, the system comprising:
   a user interface receiving one or more inputs like a political candidate's name and a "for-or-against" selection indicating support or opposition of that candidate;
   at least one pre-trained large language model (LLM) configured to receive the one or more inputs, the large-language model configured with in-context learning using examples from data in the Knowledge Base having data categories including both political issue-oriented and candidate-oriented resources, such as local and global news, local/state/federal government statistics, public census/voter opinion polls, social media messages, comment sections of news and social media platforms about the issue, and each candidate's position/stance on and related to the issue, as disclosed by the candidate in candidate's campaign website, in candidate's own words, speeches, press releases and previous legislative voting records by candidate regarding the issue;
   a pre-trained embedding model for embedding generation, wherein the pre-trained embedding model is configured to select semantically similar parts of the candidate's profile or statistics and provide contextual information related to the candidate to the at least one pre-trained LLM;
   wherein the LLM is further configured to create messages based on user-chosen message topics/issues, candidate names, and message modifiers to personalize the user-created draft messages with subsequent draft message modifiers as needed by the user to create a personalized final draft message approved by the user incorporating the message issue, themes, tones, and other input by and to the personal satisfaction of the user; and
   an AI Message Generator combining information from the large language model, using unsupervised and supervised learning techniques, to create political messages for distribution by the user via email, SMS/text and/or social media messaging platforms, wherein the LLM is configured to carry out a plurality of customized tasks, including information filtering, profile creation, and knowledge extraction from the Knowledge Base, based on one or more predefined custom-made examples,
   wherein the AI Message Generator further comprises a Message Format output to include Text-to-Audio Narrated Video Message Format for which a number of visual images needed for the Text-to-Audio Narrated Video Message Format is automatically selected and determined based on the length of the original Text-Based Message's narration and an average image screen duration during playback, wherein the number of images required to accompany the length of the narration are automatically selected based on at least two of the following sources of images for the user to re-edit:
   Priority use of the Statistical Images, graphs, charts, and tables from the Knowledge Base used in the creation of the Text-based Message;
   AI/Machine Learning Interpretation of a meaning of the sentences in the Message; and
   Image Search Engine search results using the Message's Issue and the Message's Words/Phrases as the Search Terms for the image searches.

2. The system of claim 1, wherein the AI Message Generator includes a Message Distribution Localizer, customizing messages based on a recipient's IP/MAC Address/ GPS or recipient-input street address or Zip Code, enabling identification of the user's location to determine its associated local, state, and federal election voting districts for listing the names of the Candidate(s) running for office in upcoming elections in the associated voting district of the message recipient.

3. The system of claim 1, wherein the LLM with in-context learning comprises a Voter Profile Integration module aggregating voter opinions on trending Issues, voter age range, party affiliation, state legislative and federal Congressional voting district location, voter contact information, and voter donation information/connection to online/mobile payment services.

4. The system of claim 1, wherein the LLM with in-context learning includes an Issue Profile Integration module determining trending national and local issues based on search engine search results, analytics, local and national online news resource searches, including legislative news and legislative voting history databases about the Issues.

5. The system of claim 1, wherein the LLM with in-context learning includes a Candidate Profile module utilizing semantically similar search results of the Knowledge Base to match the candidate's name with trending Issues to determine the candidate's positions/stances/comments on the Issues/local problems that voters care about.

6. The system of claim 4, wherein the Candidate Profile module compiles information about the candidate, and the candidate's inferred and stated political stances and solutions to the Issues of concern to voters, as disclosed on the Candidate's campaign website content, social media messages, press releases, verbal quotes/speeches, and previous legislative votes.

7. The system of claim 1, wherein the LLM with in-context learning includes an automated data retrieval module parsing and retrieving data from select websites, using Large Language Models (LLMs) for information extraction, wherein the data retrieval module scrapes various social media platforms and direct news links for effective data processing.

8. The system of claim 1, wherein the Knowledge Base is user-customizable and allows the addition of website URLs and user-customizable content/words/phrases with emotional nuance changes to message tone or other user-chosen message modifiers to the user's satisfaction.

9. The system of claim 1, wherein the AI Message Generator provides automated choices of message Issue/ subject based on trending news stories and popular unsolved social/political issues and problems of potential concern to voters.

10. The system of claim 1, wherein the AI Message Generator includes a user-input Issue/subject customization component of an Issue/problem that is of potential concern to the user/voter.

11. The system of claim 1, wherein the AI Message Generator incorporates an Issue-oriented message-targeting component promoting the preferred candidate's stance on, and potential solutions for, the Issue, and may include criticism of the rival Candidate's position on, or proposed solution for, the issue.

12. The system of claim 1, wherein the AI Message Generator includes a promotional call-to-action message component that can be age-based, including the message theme of voter empowerment to change things, that appeals to young voters, or the message theme of patriotic identity to fulfill one's responsibility as a citizen, that appeals to older voters.

13. The system of claim 1, wherein the AI Message Generator includes a call-to-action links component to promote the local, user-preferred candidate, which may include the candidate's campaign website URL/links, social media sharing links, polling place location/directions link, voting alarm/reminder (and other voter empowerment tools), and political campaign donations (or donations to online Foundations, Charities, and Non-Profits dedicated to helping the Cause/Issue detailed in the Primary Message Issue component).

14. The system of claim 1, wherein the Message Format output also includes Text-based Message format, and Text-to-Audio Narrated Message format.

15. The system of claim 1, wherein the AI Message Generator is configured to alter or refine messages based on additional online search terms or user input.

16. The system of claim 1, wherein when a user/voter forwards the message containing a National Issue message component and a Local Candidate Call-to-Action localized message component, the localized Call-to-Action message content seen by the Message Recipient is different for each message recipient, based on the message recipient's location for promoting the Candidate running for office in the message recipient's voting district.

17. The system of claim 1, wherein the LLM receives user input of Message Modification Choices through user input, storing data on a server, and connecting a Knowledge Base.

18. The system of claim 17, wherein the user input includes Drop-Down Menu choices including a Message Issue/Topic Prompt, Message Theme Prompt, Message Tone Prompt, and an Optional Location Prompt, wherein the system utilizes an AI Text Generation Algorithm for producing statistically-factual and emotionally-persuasive messages.

19. The system of claim 1, wherein the Message Distribution Localizer comprises a Customization Module for applying desired tone, theme, and custom user message-modification instructions to improve the draft message according to the satisfaction of the user, based on one or more user inputs/prompts/modifications.

20. The system of claim 1, further comprising a storage mechanism for users to save generated messages as Drafts and User-Approved Messages by Message Draft identification number #.

21. The system of claim 1, wherein the Text-to-Audio Narrated Video Message Format includes video segments and animation sequences, and wherein the image searches encompass both static images and moving images.

22. A computer-implemented method of training a neural network for Political Election Candidate Advocacy Messaging, comprising:
  collecting a Knowledge Base set of Issue-oriented News and Commentary;
  applying searches of Candidate Names in the Knowledge Base/database, including searches of government websites, Candidate campaign updates, and opinion polls; and
  creating training sets and training the neural network in multiple stages, adapting to evolving contexts and user preferences to create messages to the satisfaction of the user, wherein the neural network dynamically adapts to user queries, political landscape changes, and real-time data integration.

23. The system of claim 22, wherein the neural network adapts its training based on the specificity of user queries to generate nuanced political messages.

24. A computer-implemented political messaging application, comprising:
- a Voter Profile Database containing opinions on social problems and issues;
- an Issue of the Day Profile Database comprising local and national voter concerns about problems that need to be fixed;
- a Candidate Profile Database storing specific quotes, comments, news coverage, political positions, and stances on the issues made by political candidates on social media;
- an AI Message Generator combining information from the Voter Profile, Issue of the Day Profile, and Candidate Profile to create time-relevant and location-relevant daily messages; and
- a Message Distribution Localizer for social media linking and customizing messages based on time and the recipient's location;
- wherein the AI Message Generator is further configured to output Text-to-Audio Narrated Video Message Format for which a number of visual images needed for the Text-to-Audio Narrated Video Message Format is automatically selected and determined based on the length of the original Text-Based Message's narration and an average image screen duration during playback, wherein the number of images required to accompany the length of the narration are automatically selected based on at least two of the following sources of images for the user to re-edit:

Priority use of the Statistical Images, graphs, charts, and tables from the Knowledge Base used in the creation of the Text-based Message;

AI/Machine Learning Interpretation of a meaning of the sentences in the Message; and Image Search Engine search results using the Message's Issue and the Message's Words/Phrases as the Search Terms for the image searches.

* * * * *